United States Patent [19]

Koerv

[11] Patent Number: 5,018,009
[45] Date of Patent: May 21, 1991

[54] ARRANGEMENT FOR A REMOTE-CONTROLLED TRACK-GUIDED PICTURE TRANSMISSION

[75] Inventor: Peter Koerv, Vaterstetten, Fed. Rep. of Germany

[73] Assignee: Messerschmitt-Bolkow-Blohm GmbH, Fed. Rep. of Germany

[21] Appl. No.: 470,355

[22] Filed: Jan. 25, 1990

[30] Foreign Application Priority Data

Jan. 25, 1989 [DE] Fed. Rep. of Germany ....... 3902076

[51] Int. Cl.$^5$ .............................................. H04N 7/18
[52] U.S. Cl. .................. 358/100; 358/108; 358/210; 104/295
[58] Field of Search ................. 358/100, 108, 87, 93, 358/210, 229, 125; 901/1, 16, 47; 104/290, 295, 296, 297; 180/168; 343/713

[56] References Cited

U.S. PATENT DOCUMENTS

| | | | |
|---|---|---|---|
| 2,531,497 | 11/1950 | Beatty | |
| 2,538,910 | 1/1951 | Miller | 358/108 |
| 4,345,662 | 8/1982 | Deplante | 180/168 |
| 4,510,526 | 4/1985 | Coutta et al. | 358/108 |
| 4,559,555 | 12/1985 | Schoolman | 358/108 X |
| 4,656,509 | 4/1987 | Matsuyama et al. | 358/100 |
| 4,803,563 | 2/1989 | Dailey et al. | 358/100 |

FOREIGN PATENT DOCUMENTS 1163899 2/1964 Fed. Rep. of Germany.
589911 7/1977 Switzerland.

Primary Examiner—Victor R. Kostak
Attorney, Agent, or Firm—Evenson, Wands, Edwards, Lenahan & McKeown

[57] ABSTRACT

A remote-controlled track-guided system for a video camera manipulator is provided. A fixed guide rail carries a movable carriage for the video camera and mechanisms for manipulating the video camera to different viewing positions relative to the carriage. To facilitate remote control of the manipulator mechanisms and the carriage an antenna carried by the carriage is disposed to engage in a slotted wave guide fixed at the guide rail.

18 Claims, 3 Drawing Sheets

ARRANGEMENT FOR A REMOTE-CONTROLLED TRACK-GUIDED PICTURE TRANSMISSION

BACKGROUND AND SUMMARY OF THE INVENTION

The present invention relates to an arrangement for a remote-controlled track-guided picture transmission by means of a video camera which is fastened to a movable carriage having at least one carrier wheel which supports itself on a carrier rail.

The conventional techniques for transmitting pictures, for example, at sports events, in television studios or for monitoring automated work areas, are largely limited to stationary positions of the monitoring camera so that an observation which covers more extensive course areas is possible only incompletely by means of a large number of cameras and expensive switching devices or from a high-angle perspective from poles over larger distances. In this case, the transmission usually takes place by way of very obstructing cables or without any cables by way of expensive radio equipment which, as a result of the open and radiating process, are subjected to all kinds of disturbing environmental influences, such as constructional obstacles and obstacles of the landscape, reflections, interferences, noise fields and the like. A conceivable transmission by means of laser light also requires a linear visual connection and is affected negatively by environmental conditions, such as dust, rain and fog.

It is an object of the present invention to observe objects, which are moved along a given course which may also be provided with turns and elevated areas, without any gaps at a high speed in a remote-controlled manner, without any interferences with respect to the transmission and unimpaired by cables or shadowed areas. In this case, the observing location, for changing the perspective, is to be changed arbitrarily, moving in front of or behind the object to be observed, in which case, the picture transmission camera may take up arbitrary spatial angles of rotation, and the lens adjustments can be adjusted in a remote-controlled manner.

Based on an arrangement of the initially mentioned type, this object is achieved according to preferred embodiments of the invention by providing a remote-controlled track-guided picture transmission by means of a video camera which is fastened to a movable carriage having at least one carrier wheel which supports itself on a carrier rail, comprising a movable carriage carrying:

a drive for the carrier wheel,
a control arrangement for the drive,
an inductive scanning device which is assigned to the drive, for the position control and location control,
a manipulator for the video camera,
a transmitting and receiving apparatus for the remote-controlled signals,
an antenna for the receiving and transmitting of the signals, and
at least one guide roller, and stationary supporting structure including:
at least one guide rail on which the guide rollers are supported, and
a slotted wave guide in which the antenna of the carriage engages.

The invention permits a remote-controlled moving along extensive sports, testing, industrial facilities and the like which have turns, elevated areas etc., directly next to the object to be observed, also at high speeds up to approximately 200 km/h, in which case the advantage is achieved that a space-saving, cost-effective arrangement of the carrier rail of the slotted wave guide and of the conductor rails or of the longitudinal stator is ensured which is adapted to the course of a route to be observed up to radii of approximately 1 m. The bidirectional transmission technique by means of the slotted wave guide known per se which is free of cables and contacts and is completely independent of environmental influences and is therefore free of interferences and which is possible at arbitrary driving speeds, and the fastening of the carrier rails and conductor rails or of the longitudinal stator drive permits a continuous monitoring and observation, which is free of errors, of stationary or moved objects, such as the course monitoring of sports events, such as horse races, track and field athletics, ice racing, motorcycle racing, car racing (preferably for segments of courses at which the cameras are to change their location), ski racing with blind stretches;

the moving along backdrops of television studios;

the following of vehicles or flying objects in expansive testing facilities with camera panning by driving behind and adjusting the angles;

the visual and, if necessary acoustical monitoring of security areas or danger areas, such as driving along fences or borders of airports, power plants, industrial facilities, and atomic research facilities;

the monitoring of automated working areas either in mining (where the longitudinal stator drive is preferred because of a reduced danger of explosion), in industrial manufacturing areas; and monitoring in hospitals, for example, of large intensive care stations with little personnel, in which case a visual monitoring and querying can take place of measuring apparatuses, infusion devices, and the like.

Since, according to the invention, the supporting structure is constructed of module-type elements or sections which have standard dimensions, the structure may be adapted to vertical bends as well as to horizontal bends, in which case holding arrangements are provided at given distances which connect the individual supporting structure sections with one another. In order to compensate temperature differences, expansion-compensating members may also be integrated.

Other objects, advantages and novel features of the present invention will become apparent from the following detailed description of the invention when considered in conjunction with the accompanying drawings.

DETAILED DESCRIPTION OF THE DRAWINGS

In the figures, in which identical parts have identical reference numbers, a carriage has the number 9 which is slidably arranged along a supporting structure 10 an carries at least one video camera 12.

Figure 1:
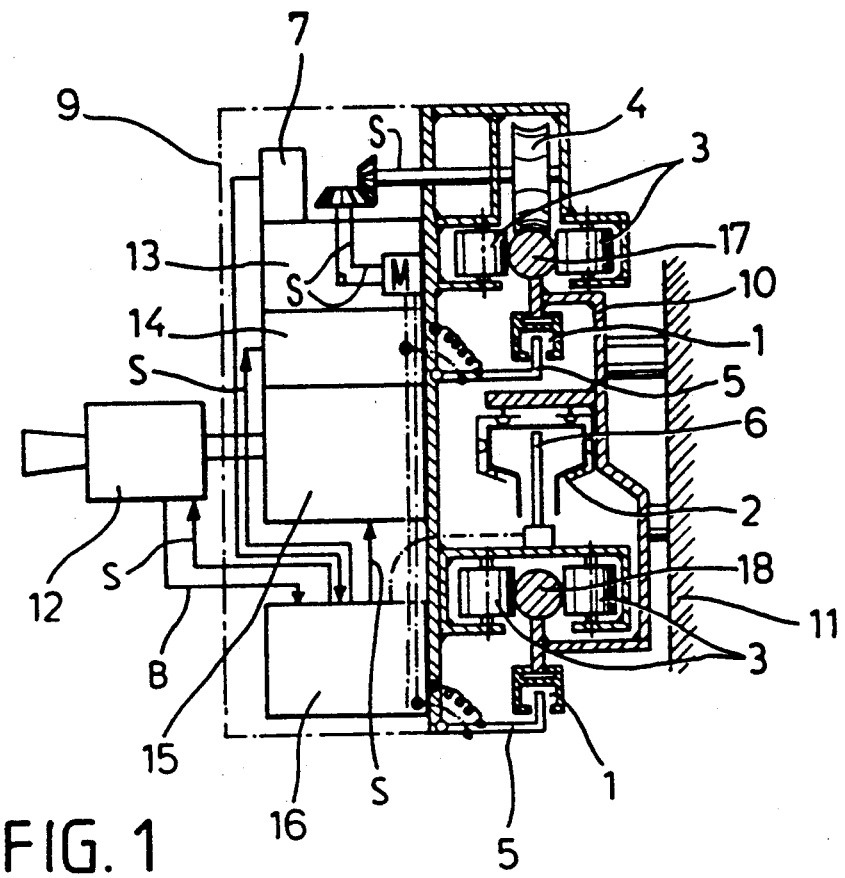
FIG. 1 is a cross-sectional view of a first embodiment of a carriage with a pertaining supporting structure with conductor rails, which is particularly suitable for horizontal bends, constructed according to a preferred embodiment of the invention.

In the embodiment shown in FIG. 1 which is particularly suitable for supporting structures along horizontally bent or curved courses, a carrier wheel 4 is provided in the carriage 9 and has a pertaining drive 13. A control for this drive has the reference number 14; 15 is a manipulator for the control of the video camera 12; and 16 is a transmitting and receiving apparatus for receiving and transmitting remote-controlled signals. For the receiving and sending of these signals, an antenna 6 is provided; while in this embodiment, four guide rollers 3 are provided for the track guiding of the carriage 9.

The pertaining supporting structure 10 which can be fastened to a wall, a rail or a carrier pole 11, in the selected embodiment, has a carrier rail 17 on which the carrier wheel 4 as well as two guide rollers support themselves as well as, in addition, a guide rail 18 on which two additional guide rollers 3 are supported. A slotted wave guide 2, in which the antenna 6 of the carriage engages, is provided for the interference-free transmitting of the signals. A path emitter in the carriage 9 has the reference number 7. Current collectors 5 engage in conductor rails 1 for transmitting electric power for driving motor M, which drives the transmission shafts S for the wheel 4 via chain drive C.

By means of this type of an arrangement, it is possible to observe moving objects on a given course which may also be provided with turns of up to a minimum radius of 1 m, as well as with elevated areas. As a result of the successive arrangement of a plurality of individual finite supporting structures the video camera carriage can move at the same speed as the objects on a parallel course, at speeds of up to 200 km/h. The signals are transmitted without any interferences and unimpaired by cables or shadow areas by means of the slotted wave guide. For changing the perspective, the observation location may be changed arbitrarily from the observed object, in which case a following object may also be covered. Because of the transmitting and receiving apparatus as well as the pertaining manipulator for the video camera 12, this video camera 12 may take up arbitrary spatial angles of rotation, in which case, the lens adjustments, i.e., the focusing and image angle, as well as the height can also be remote-controlled by means of a suitable telescope control.

The construction of the supporting structure along a limited or endless course with module-type elements or course sections permits a fast setting-up and removal and thus a changing of the course depending on the local requirements.

The stationary supporting structure is developed such that all operating parts, such as the carrier rail, the guide rail, the slotted wave guide, and the conductor rail may not only be manufactured straight but also with the same radius of curvature. All carrying and operating sections are hung up at regular distances along a given driving course and are connected with one another by means of common holding arrangements.

Figure 5:
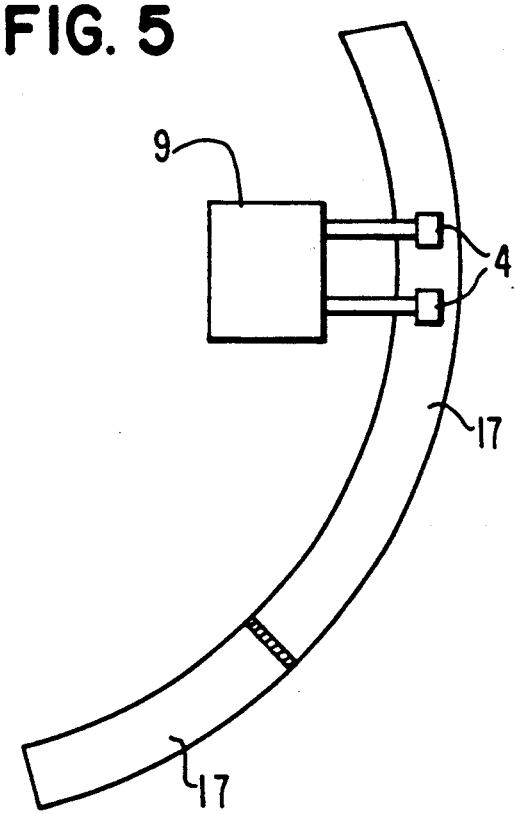
FIG. 5 is a schematic top view showing a carriage on a curved track support structure.

The carrying and operating sections have standard lengths and bends that can be handled and are adapted to the distances of the holding arrangements. Corresponding expansion compensating elements may be integrated into the holding arrangements. FIG. 5 schematically depicts a curved multi-part supporting track 17.

Figure 2:
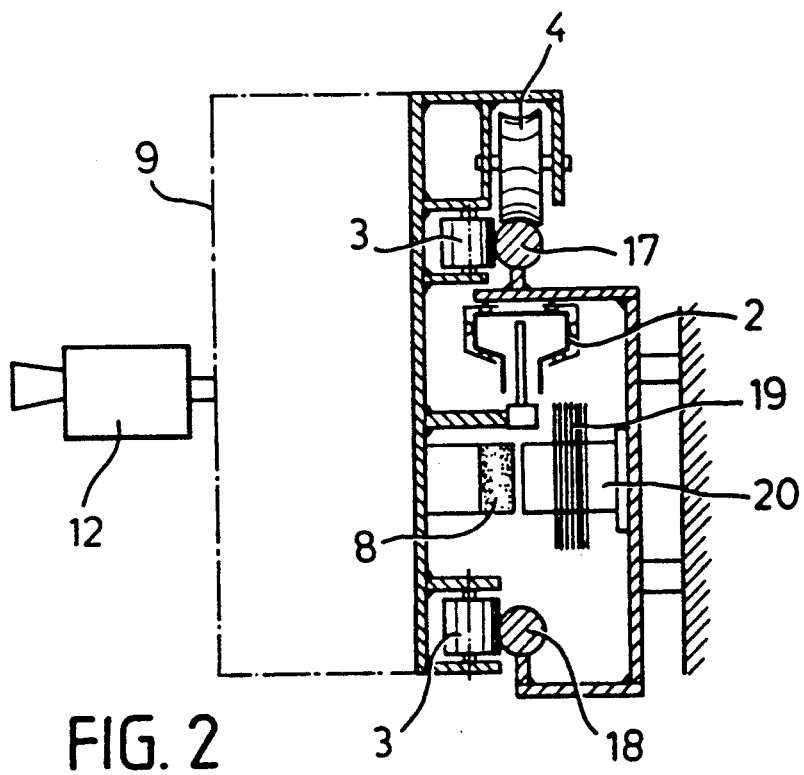
FIG. 2 is a cross-sectional view of a second embodiment of a carriage with a pertaining supporting structure having a longitudinal stator.

In the embodiment shown in FIG. 2, only one carrier rail 17 is provided in the carriage 9, on which the carrier wheel 4 supports itself. Instead of a drive by means of an electric motor and a transmission for the carrier wheel 4, the carriage 9, in this case, is provided with a permanent magnet 8 which interacts with a longitudinal stator 20 assigned to it in the supporting structure, this longitudinal stator 20 carrying a bundle of laminations which is known per se and has a pertaining winding 19. This construction, which is known from magnetic levitation, replaces not only the separate drive for the carrier wheel 4, but also the conductor rails 1, in which case the drive takes place by means of the permanent magnet which, on the one hand, is used as the exciting part for the stationary construction of the longitudinal stator and, on the other hand, because of its attractive power to the longitudinal stator, provides a contact pressure of the carrier wheels and the guide rollers which is secure with respect to derailing, also in the case of arbitrary carriage positions without any additional guide rollers. By means of an inductive scanning arrangement which is known from the magnetic cushion train as well as a connected counting device, a position control and location control of the drive may take place.

Figure 3:
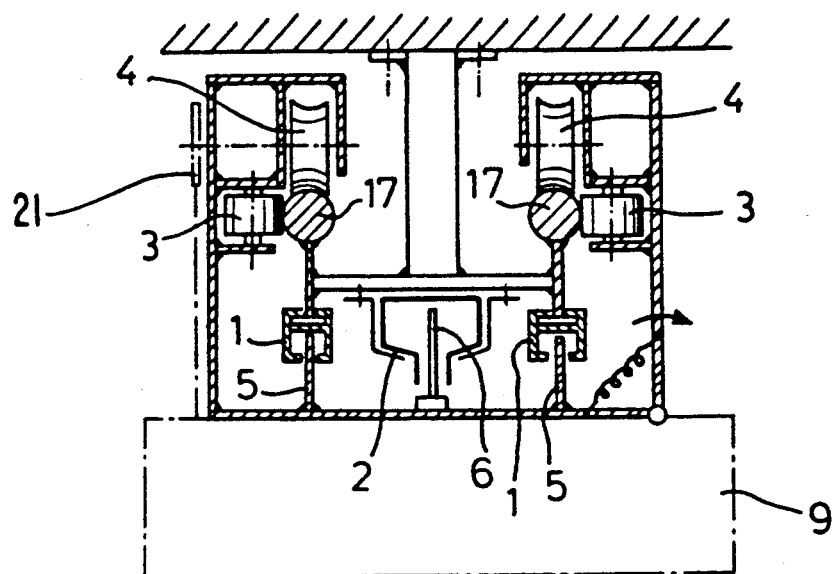
FIG. 3 is a cross-sectional view of a third embodiment of a carriage having a pertaining supporting structure with conductor rails which is preferably suitable for vertical bends.

FIG. 3 is a sectional view of another embodiment which is particularly suitable for vertical bends or curves of the supporting structure. In this case, two carrier rails 17 are provided which are situated in a horizontal plane and on which two carrier wheels 4 are supported as well as two guide rollers. In this case also, two conductor rails 1 are provided again in which current collectors 5 engage, as well as a slotted wave guide 2 in which a corresponding antenna 6 engages. The drive for the carrier wheel 4 has the reference number 21 and, for example, has a belt or a chain.

Figure 4:
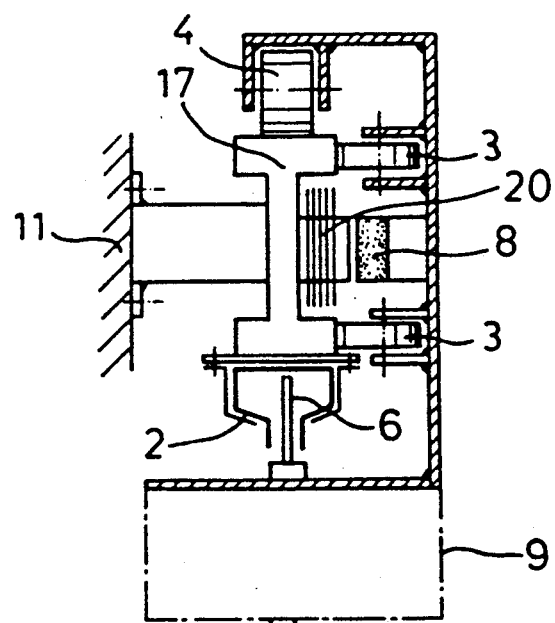
FIG. 4 is a cross-sectional view of a fourth embodiment of a carriage with a pertaining supporting structure and a longitudinal stator.

In the sectional view of an embodiment of the arrangement according to the invention shown in FIG. 4, the drive for the carrier wheel together with the two conductor rails is replaced again by a permanent magnet 8 at the carriage 9 and a longitudinal stator 20 in the supporting structure. For the secure moving of the carriage 9, one carrier wheel 4 as well as two guide rollers 3 are sufficient.

Instead of or in addition to the video camera, a manipulator may be arranged on the carriage for the handling of workpieces or the like which can also be actuated in a remote-controlled manner by way of the slotted wave guide transmission.

The invention therefore provides the combination of the slotted wave guide transmission technique with the operating elements carrying, guiding and driving, which is known per se, with the video camera remote control technique, which is known per se, in which case the drive of the carriage takes place either by way of conductor rails and an electric motor as well as a transmission or by way of a stationary longitudinal stator and a mobile permanent magnet. The slotted wave guide permits a cable-free and contactless data transmission from and to the carriage for the transmitting and receiving apparatus, for the transmitting of the picture and/or measuring or station signals from the carriage to a receiving station and the receiving of remote-control signals from a transmitting station for the carriage drive control, the manipulator control and the camera control. In this case, the manipulator is designed for arbitrary movements of the video cameras in all axes.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for a remote-controlled track-guided picture transmission by means of a video camera which is fastened to a movable carriage having at least one carrier wheel which supports itself on a carrier rail, comprising a movable carriage carrying:
   a drive for the carrier wheel,
   a control arrangement for the drive,
   an inductive scanning device which is assigned to the drive, for the position control and location control,
   a manipulator for the video camera,
   a transmitting and receiving apparatus for remote-controlled signals,
   an antenna for the receiving and transmitting of the signals, and
   at least one guide roller and stationary supporting structure including:
   at least one guide rail on which the guide rollers are supported, and
   a slotted wave guide in which the antenna of the carriage engages.

2. An arrangement according to claim 1, wherein the drive has a belt or a chain, an electric motor with a transmission, and two current collectors with sliding contacts which interact with two conductor rails in the supporting structure.

3. An arrangement according to claim 1, wherein the drive has a permanent magnet which interacts with a longitudinal stator in the supporting structure.

4. An arrangement according to claim 1, wherein the supporting structure is divided into finite sections.

5. An arrangement according to claim 4, wherein a part of the supporting structure sections is curved in the vertical plane.

6. An arrangement according to claim 4, wherein a part of the structure sections is curved in the horizontal plane.

7. An arrangement according to claim 1, wherein in addition to the video camera, a manipulator is arranged on the carriage for the handling of objects which is also remotely controllable by way of the slotted wave guide transmission.

8. An arrangement according to claim 7 wherein said objects include workpieces.

9. An arrangement according to claim 7 wherein said objects include tools.

10. A remote-controlled track-guided system comprising: fixed guide rail means,
   a movable carriage having carrier means supported at the fixed guide rail means,
   manipulator means carried by the movable carriage,
   remote-control signal means for generating remote-control signals to control operation of the manipulator means,
   and antenna means for the receiving and sending of the remote-control signals,
   wherein said antenna means includes an antenna engaged in a slotted wave guide, said antenna being disposed at one of the carriage and fixed support structure and the wave guide being disposed at the other of the fixed carriage and fixed support structure.

11. A remote-controlled system according to claim 10, wherein said carrier means includes wheel means.

12. A remote-controlled system according to claim 10, wherein video camera means are carried by the carriage means and operably positioned by the manipulator means.

13. A remote-controlled system according to claim 10, wherein said fixed guide rail means comprises performed curved sections.

14. A remote-controlled system according to claim 10, wherein said antenna is disposed at the fixed support structure and the slotted wave guide is carried on the carriage.

15. A remote-controlled system according to claim 10, further comprising drive means for drivingly moving the carriage over the fixed guide rail means.

16. A remote-controlled system according to claim 15, wherein said carrier means includes wheel means.

17. A remote-controlled system according to claim 16, wherein said drive means includes motor means on the carriage for driving at least one wheel of the wheel means.

18. A remote-controlled system according to claim 16, wherein said drive means includes magnetic drive means.

* * * * *